United States Patent
Jeong et al.

(10) Patent No.: US 10,065,272 B2
(45) Date of Patent: Sep. 4, 2018

(54) SUPER HIGH-STRENGTH FLUX CORED ARC WELDED JOINT HAVING EXCELLENT IMPACT TOUGHNESS, AND WELDING WIRE FOR MANUFACTURING SAME

(71) Applicant: POSCO, Pohang-si (KR)

(72) Inventors: Hong-Chul Jeong, Pohang-si (KR);
Jin-Woo Lee, Pohang-si (KR);
Dong-Ryeol Lee, Pohang-si (KR);
Il-Wook Han, Pohang-si (KR);
Hong-Kil Lee, Pohang-si (KR)

(73) Assignee: POSCO, Pohang-si (KR)

( * ) Notice: Subject to any disclaimer, the term of this patent is extended or adjusted under 35 U.S.C. 154(b) by 168 days.

(21) Appl. No.: 14/651,853

(22) PCT Filed: Dec. 24, 2013

(86) PCT No.: PCT/KR2013/012150
§ 371 (c)(1),
(2) Date: Jun. 12, 2015

(87) PCT Pub. No.: WO2014/104731
PCT Pub. Date: Jul. 3, 2014

(65) Prior Publication Data
US 2015/0314397 A1 Nov. 5, 2015

(30) Foreign Application Priority Data

Dec. 27, 2012 (KR) .................. 10-2012-0154333
Dec. 24, 2013 (KR) .................. 10-2013-0163194

(51) Int. Cl.
*B23K 35/30* (2006.01)
*B23K 35/02* (2006.01)
(Continued)

(52) U.S. Cl.
CPC ...... *B23K 35/0266* (2013.01); *B23K 35/0288* (2013.01); *B23K 35/30* (2013.01);
(Continued)

(58) Field of Classification Search
CPC ............ B23K 35/3053; B23K 35/3066; B23K 35/3073; B23K 35/0266; B23K 35/0288;
(Continued)

(56) References Cited

U.S. PATENT DOCUMENTS

2005/0016980 A1   1/2005   Hara et al.
2010/0230016 A1   9/2010   Kumagai
2011/0250471 A1   10/2011  Hara et al.

FOREIGN PATENT DOCUMENTS

CN   101835918   9/2010
EP   1769882    4/2007
(Continued)

OTHER PUBLICATIONS

Machine translation of JP H10-324950 A.*
(Continued)

*Primary Examiner* — Kregg T Brooks
(74) *Attorney, Agent, or Firm* — Cantor Colburn LLP (57) ABSTRACT

An ultra high-strength flux-cored arc welded joint having excellent impact toughness comprises: 0.01 wt % to 0.06 wt % of carbon (C), 0.1 wt % to 0.5 wt % of silicon (Si), 1.5 wt % to 3.0 wt % of manganese (Mn), 2.5 wt % to 3.5 wt % of nickel (Ni), 0.5 wt % to 1.0 wt % of molybdenum (Mo), 0.4 wt % to 1.0 wt % of copper (Cu), 0.4 wt % to 1.0 wt % of chromium (Cr), 0.01 wt % to 0.1 wt % of titanium (Ti), 0.003 wt % to 0.007 wt % of boron (B), 0.001 wt % to 0.006 wt % of nitrogen (N), 0.02 wt % (excluding 0) or less of phosphorus (P), 0.01 wt % (excluding 0) or less of sulfur (S), 0.03 wt % to 0.07 wt % of oxygen (O), and remaining iron (Fe) as well as unavoidable impurities.

6 Claims, 1 Drawing Sheet

(51) Int. Cl.
*B23K 35/362* (2006.01)
*B23K 35/368* (2006.01)
*B23K 9/23* (2006.01)
*C22C 38/02* (2006.01)
*C22C 38/04* (2006.01)
*C22C 38/08* (2006.01)
*C22C 38/12* (2006.01)
*C22C 38/42* (2006.01)
*C22C 38/44* (2006.01)
*C22C 38/50* (2006.01)
*C22C 38/54* (2006.01)
*C22C 38/58* (2006.01)
*C22C 38/00* (2006.01)
*C22C 38/22* (2006.01)
*C22C 38/24* (2006.01)
*C22C 38/38* (2006.01)
*B23K 35/36* (2006.01)

(52) U.S. Cl.
CPC ...... *B23K 35/3053* (2013.01); *B23K 35/3066* (2013.01); *B23K 35/3073* (2013.01); *B23K 35/3602* (2013.01); *B23K 35/3605* (2013.01); *B23K 35/3607* (2013.01); *B23K 35/3608* (2013.01); *C22C 38/00* (2013.01); *C22C 38/02* (2013.01); *C22C 38/04* (2013.01); *C22C 38/08* (2013.01); *C22C 38/12* (2013.01); *C22C 38/22* (2013.01); *C22C 38/24* (2013.01); *C22C 38/38* (2013.01); *C22C 38/42* (2013.01); *C22C 38/44* (2013.01); *C22C 38/50* (2013.01); *C22C 38/54* (2013.01); *C22C 38/58* (2013.01); *Y10T 403/479* (2015.01)

(58) Field of Classification Search
CPC ............... B23K 35/30; B23K 35/3602; B23K 35/3605; B23K 35/3607; B23K 35/3608; C22C 38/00; C22C 38/001; C22C 38/002; C22C 38/005; C22C 38/02; C22C 38/04; C22C 38/08; C22C 38/12; C22C 38/14; C22C 38/16; C22C 38/18; C22C 38/20; C22C 38/22; C22C 38/24; C22C 38/26; C22C 38/28; C22C 38/40; C22C 38/42; C22C 38/44; C22C 38/46; C22C 38/48; C22C 38/50; C22C 38/54
See application file for complete search history.

(56) References Cited

FOREIGN PATENT DOCUMENTS

| | | |
|---|---|---|
| GB | 1123926 | 8/1968 |
| JP | 08257785 | 10/1996 |
| JP | 10180488 | 7/1998 |
| JP | 10324950 | 12/1998 |
| JP | 11170085 | 6/1999 |
| JP | 11267844 | 10/1999 |
| JP | 2000254781 | 9/2000 |
| JP | 2000256779 | 9/2000 |
| JP | 2002115032 | 4/2002 |
| JP | 2005040816 | 2/2005 |
| JP | 2005279768 | 10/2005 |
| JP | 2009255169 | 11/2009 |
| JP | 2012176434 | 9/2012 |
| KR | 1019980068561 | 10/1998 |
| KR | 1020070035996 | 4/2007 |
| KR | 100833048 | 5/2008 |
| KR | 1020090016854 | 2/2009 |
| KR | 1020100060020 | 6/2010 |
| KR | 1020100074940 | 7/2010 |
| KR | 1020120111432 | 10/2012 |
| KR | 1020130003686 | 1/2013 |

OTHER PUBLICATIONS

Machine translation of KR 100833048 B1.*
Machine translation of KR 1020120111432 A.*
Chinese Office Action—Chinese Application No. 201380068404.8 dated Jul. 22, 2016, citing KR 10-2012-0111432, CN 101835918, KR 10-2009-0016854, GB 1123926 and KR 10-2010-0074940.
Japanese Office Action—Japanese Application No. 2015-550313 dated Jul. 5, 2016, citing JP 2005-040816, JP 11-267844, JP 10-324950, JP 2000-254781, KR 10-2012-0111432 and KR 10-0833048.
International Search Report—PCT/KR2013/012150 dated Mar. 31, 2014.

* cited by examiner

SUPER HIGH-STRENGTH FLUX CORED ARC WELDED JOINT HAVING EXCELLENT IMPACT TOUGHNESS, AND WELDING WIRE FOR MANUFACTURING SAME

TECHNICAL FIELD

The present disclosure relates to a flux-cored arc welded joint obtained by flux-cored arc welding (FCAW) high tension steel used for offshore structures, building construction, bridge construction, shipping vessels, and the like, and a flux-cored arc welding wire for manufacturing the same.

BACKGROUND ART

Recently, enlargements in the scale of shipping vessels, building construction, offshore structures, and the like, have been undertaken, in order to add value thereto. Since such structures and vessels may cause catastrophic environmental damage, fatalities, and property loss in a single accident, types of steel having high degrees of strength, extra levels of thickness and high low-temperature toughness need to be used in the construction of such structures and vessels.

For the efficient development of such steels, suitable welding operations are required, and the most widely used welding technique in the case of welding such steels is the flux-cored arc welding (FCAW) technique.

The securing of stability in welded structures obtained from the welding technique described above is an important consideration, and in this regard, securing tensile strength and impact toughness in welded joints is essential. In addition, in order to prevent low-temperature cracks in a welded joint during a flux-cored arc welding operation, decreasing the content of diffusible hydrogen within welding materials is crucial.

Generally, a welded joint formed during a welding operation may form a coarse columnar structure when a portion of steel is diluted to form a melt pool while welding materials are melted, and the melt pool is subsequently solidified. The structure thereof may be changed according to the welding materials and an amount of heat input during welding. Since coarse grain boundary ferrite, Widmanstätten ferrite, martensite, and martensite austenite (M-A) constituents may be formed in coarse austenite grain boundaries of a welded joint, impact toughness thereof may be significantly deteriorated.

Therefore, in the case of the metals of offshore structures and the like, refinements in the metal structures thereof have been pursued through the complex addition of alloying elements, such as nickel (Ni), titanium (Ti), boron (B), and the like, along with the addition of deoxidizing, denitrifying, or dehydrogenating elements, in order to secure low-temperature impact toughness.

A mechanism for structural refinement by the complex addition of Ti—B—Ni may generate fine ferrite in austenite grains through matrix toughening by Ni, inhibitive action of pro-eutectoid ferrite formation due to prior austenite grain boundary segregation of dissolved B, and Ti, B, oxides and nitrides.

As described above, there is a need to secure impact toughness in welded joints by controlling the microstructure of welded joints in order to secure stability of a welded structure.

In the related art with respect to the above, Patent Document 1 provides technology relating to a technique regulating compositions and microstructures of welded joint, which describes an ultra high-strength SAW welded joint equal to or greater than 950 MPa grade, having excellent low-temperature toughness containing 0.7 to 0.8 wt % of carbon, a microstructure of a welding metal portion containing 10-20% of low bainite and martensite, and 60 area % or more of acicular ferrite.

In addition, Patent Document 2 and Patent Document 3 relate to an ultra high-strength steel pipe having seam welding joint with excellent cold-crack resistance and manufacturing methods thereof. Here, excellent cold-crack resistance may be secured through the inclusion of 1% or more retained austenite in the seam welding metal portion, but impact toughness of the welding metal portion may be deficient.

While Patent Document 4 defines components of welding materials, since such components do not directly control the microstructure, particle size, and the like of a welded joint, it may be difficult to obtain a sufficient degree of welded joint toughness from such welding materials.

On the other hand, in order to prevent the formation of low-temperature cracks in high-strength welded joints, a content of diffusible hydrogen may be maintained to be as low as possible.

In the case of a rutile-based flux-cored wire according to the related art, a diffusible hydrogen content of a welded zone is within a degree of 8-10 ml/100 g. However, when welding thick, high-strength steel using such flux-cored wire, a preheating operation is required for the prevention of low-temperature cracks, and an additional operating charge may arise as a result.

Generally, a rutile-based flux-cored wire is used in a flux-cored arc welding technique, which is manufactured by drawing a wire such that a diameter of the wire has a size suitable for welding after filling the wire with flux containing high amounts of crystal water and bound water which serve as resources for diffusible hydrogen during a welding operation. However, in the wire drawing process, adhered and remaining organic components of lubricants may increase the diffusible hydrogen content of a welded zone during the welding operation.

In order to resolve the problem as described above, Patent Document 5 proposes a technique relating to a high-temperature heat treatment of a tubular wire at 600-800° C. However, the commercialization of such a technique may be difficult due to a decreased manufacturing speed caused by a high-temperature heat treatment and an increased high heat treatment costs.

In addition, Patent Document 6 provides a preheat-free flux-cored wire for 490 Mpa or more high tensile steel, containing 0.5% to 4.5% of an arc stabilizer and a slag former, and 1.0% to 4.0% of a deoxidizer, based on 0.05% to 0.25% of vanadium (V), and describes diffusible hydrogen trapping through VC formation by the addition of V and a carbon fixation effect. However, it may be difficult to secure stable arc properties since the effect of the diffusible hydrogen reduction result by V during welding may be insignificant, and the total amount of a fluorine (F) content of alkali and an alkaline earth metal-based fluoride is high, for example, 1.0% to 2.0%.

Patent Document 7 describes a technology providing a flux, containing 4.0% to 8.0% of titanium dioxide ($TiO_2$), 0.02% to 0.4% of alkali metal fluoride (fluorine equivalence), and 0.02% to 0.4% of polytetrafluoroethylene (PTFE) (fluorine equivalence) based on the total weight of the wire; regulating the fluorine equivalence of alkali-earth metal fluoride to 0.01% or less; and controlling (fluorine equivalence of alkali metal fluoride+0.35)/(fluorine equivalence of PTFE) to be 1 or more. However, it may be difficult to commercialize such a wire due to a low specific gravity of PTFE compared to that of fluoride present in a mineral state causing wire filling and surface application to be difficult, and due to costs being relatively high.

Therefore, there is a need for the development of welding materials for an improvement in impact toughness of a welded joint, as well as a reduction diffusible hydrogen during welding.

(D1) Korean Patent Laid-Open Publication No. 2009-0016854

(D2) Japanese Patent Laid-Open Publication No. 2000-256779

(D3) Japanese Patent Laid-Open Publication No. 2002-115032

(D4) Japanese Patent Laid-Open Publication No. 11-170085

(D5) Korean Patent Laid-Open Publication No. 1998-0068561

(D6) Japanese Patent Laid-Open Publication No. 1996-257785

(D7) Korean Patent Laid-Open Publication No. 2007-0035996

DISCLOSURE

Technical Problem

An aspect of the present disclosure provides a welded joint having excellent impact toughness in a welded structure formed by welding ultra high-strength steel having a tensile strength equal to or greater than 900 MPa.

An aspect of the present disclosure also provides a welding material, in detail, a flux-cored arc welding wire, capable of obtaining a welded joint having excellent impact toughness during flux-cored arc welding of ultra high-strength steel, as well as lowering a diffusible hydrogen content.

Technical Solution

According to an aspect of the present disclosure, an ultra high-strength flux-cored arc welded joint having excellent impact toughness may include 0.01 wt % to 0.06 wt % of carbon (C), 0.1 wt % to 0.5 wt % of silicon (Si), 1.5 wt % to 3.0 wt % of manganese (Mn), 2.5 wt % to 3.5 wt % of nickel (Ni), 0.5 wt % to 1.0 wt % of molybdenum (Mo), 0.4 wt % to 1.0 wt % of copper (Cu), 0.4 wt % to 1.0 wt % of chromium (Cr), 0.01 wt % to 0.1 wt % of titanium (Ti), 0.003 wt % to 0.007 wt % of boron (B), 0.001 wt % to 0.006 wt % of nitrogen (N), 0.02 wt % (excluding 0) or less of phosphorus (P), 0.01 wt % (excluding 0) or less of sulfur (S), 0.03 wt % to 0.07 wt % of oxygen (O), and remaining iron (Fe) as well as unavoidable impurities, wherein a carbon equivalent (Ceq) value satisfies 0.73-0.85% as defined by Formula 1 below, wherein the microstructure includes a mixed structure including 40 area % or more of acicular ferrite and 40-50% of bainite and martensite in area fraction.

$$Ceq = C + Si/24 + Mn/6 + Ni/40 + Cr/5 + Mo/4 + V/14 \quad \text{<Formula 1>}$$

According to another aspect of the present disclosure, a high-strength flux-cored welding wire may include, by weight percentage to total weight percentage of the wire, 0.03% to 0.12% of carbon (C), 0.3% to 1.4% of silicon (Si), 1.5% to 3.5% of manganese (Mn), 2.5% to 3.5% of nickel (Ni), 0.3% to 1.0% of molybdenum (Mo), 0.3% to 1.0% of chromium (Cr), 0.4% to 1.0% of copper (Cu), 0.001% to 0.020% of boron (B), 0.02 to 1.5% of titanium (Ti)+magnesium (Mg), and remaining iron (Fe) as well as unavoidable impurities; and 4.5% to 9.0% of titanium dioxide ($TiO_2$), 0.2% to 2.0% of one or two of silicon dioxide ($SiO_2$) and zirconium dioxide ($ZrO_2$), 0.1% to 1.0% of calcium carbonate ($CaCO_3$), 0.10% to 1.5% of one or two or more of K, Na, Li-based alkaline oxides; and alkali or alkaline earth metal-based fluoride containing 0.025 to 0.5% of fluorine.

Advantageous Effects

According to an exemplary embodiment in the present disclosure, an ultra high-strength flux-cored arc welded joint having excellent impact toughness, as well as high-strength physical properties, may be provided. Furthermore, a flux-cored arc welding wire capable of efficiently reducing diffusible hydrogen content may be provided, and the welded joint may also be manufactured using the flux-cored arc welding wire.

BEST MODE

Hereinafter, according to embodiments in the present disclosure, a flux-cored arc welded joint and a flux-cored arc welding wire for manufacturing the same will be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The present disclosure will be described in detail as below.

After thoroughly researching a method of providing an ultra high-strength flux-cored arc welded joint having a tensile strength of 900 MPa or more and excellent impact toughness, the present inventors completed the present disclosure on the basis of deducing an optimal structural fraction in order to secure a balance between high-strength and a high degree of toughness, and newly discovered that a degree of tensile strength equal to or greater than 900 MPa as well as impact toughness may be secured in a welded joint when welding metal constituents and a scope of carbon equivalent equation are controlled adequately in order to secure such a structural fraction.

In addition, after intensive research into a means of efficiently reducing diffusible hydrogen, a factor causing low-temperature cracks in a welded zone, the goal of the present inventors was to control a material that may efficiently cause a dehydrogenation effect in a flux-cored arc welding wire.

First, a high-strength flux-cored arc welded joint of the present disclosure, having excellent impact toughness, will be described in detail.

According to an exemplary embodiment in the present disclosure, an ultra high-strength flux-cored arc welded joint having excellent impact toughness may include 0.01 wt % to 0.06 wt % of carbon (C); 0.1 wt % to 0.5 wt % of silicon (Si);

1.5 wt % to 3.0 wt % of manganese (Mn); 2.5 wt % to 3.5 wt % of nickel (Ni); 0.5 wt % to 1.0 wt % of molybdenum (Mo); 0.4 wt % to 1.0 wt % of copper (Cu); 0.4 wt % to 1.0 wt % of chromium (Cr); 0.01 wt % to 0.1 wt % of titanium (Ti); 0.003 wt % to 0.007 wt % of boron (B); 0.001 wt % to 0.006 wt % of nitrogen (N); 0.02 wt % (excluding 0) or less of phosphorus (P); 0.01 wt % (excluding 0) or less of sulfur (S); 0.03 wt % to 0.07 wt % of oxygen (O); and remaining iron (Fe) as well as unavoidable impurities.

Hereinafter, reasons for limitations of the above compositions will be described in detail. Here, the constituents are represented in weight percentage.

C: 0.01-0.06%

Carbon (C) is a beneficial element for securing strength in a welded metal along with hardenability. To this end, C may be contained in an amount of 0.01% or more. However, in the case in which the content thereof exceeds 0.06%, impact toughness of a welded joint may be greatly decreased due to low-temperature cracks arising in the welded zone during a welding operation. Therefore, an upper limit of C content may be limited to 0.06%.

Si: 0.1-0.5%

Silicon (Si) is an element contained to achieve a deoxidizing effect. In the case in which the content of Si is less than 0.1%, the deoxidizing effect in welding metal may become insufficient, and fluidity of a welding metal may be reduced. In the case in which the content thereof exceeds 0.5%, transformation of martensite austenite (M-A) constituents in welding metal may be promoted to degrade low-temperature impact toughness and adversely affect weld crack susceptibility. Therefore, the content of Si may be limited to a range of 0.1-0.5%.

Mn: 1.5-3.0%

Manganese (Mn) is an essential element for improving deoxidization and strength, and may be precipitated in a form of MnS around TiO oxides, to promote a generation of acicular ferrite which is beneficial for improving toughness by Ti composite oxides. In addition, Mn may secure strength and toughness by forming a substitutional solid solution in a matrix structure to solid solution strengthen the matrix, and to this end, Mn may be contained in an amount of 1.5% or more. However, in the case in which the content thereof exceeds 3.0%, toughness may decrease due to a formation of low-temperature transformation structure. Therefore, an upper limit of Mn content may be limited to 3.0%.

Ni: 2.5-3.5%

Nickel (Ni) is an essential element for improving strength and toughness of a matrix by solid solution strengthening. To this end, Ni may be contained in an amount of 2.5% or more. However, in the case in which the content thereof exceeds 3.5% and becomes superabundant, hardenability may be greatly increased and high-temperature cracks may be generated. Therefore, the content of Ni may be limited to a range of 2.5-3.5%.

Mo: 0.5-1.0%

Molybdenum (Mo) is an element that improves strength of a matrix. To this end, Mo may be contained in an amount of 0.5% or more. However, in the case in which the content thereof exceeds 1.0%, the effect thereof may be saturated and weld hardenability may greatly increase to promote martensitic transformation, and thus, low-temperature weld cracks may be generated and toughness may be decreased. Therefore, the content of Mo may be limited to a range of 0.5% to 1.0%.

Cu: 0.4-1.0%

Copper (Cu) is a beneficial element for securing strength and toughness from solid solution strengthening by being solid dissolved in a matrix. To this end, Cu may be contained in an amount of 0.4% or more. However, in the case in which the content thereof exceeds 1.0%, hardenability may be increased and toughness may be decreased in a welded joint. Therefore, the content of Cu may be limited to a range of 0.4% to 1.0%.

In addition, in the case of a complex addition of Cu and Ni, the total amount of the two contents may be limited to 3.5% or less. This is because when the total amount of the two elements exceeds 3.5%, hardenability may greatly increase and adversely affect toughness and weldability.

Cr: 0.4-1.0%

Chromium (Cr) is an essential element for improving strength and hardenability by being solid dissolved in a matrix. To this end, Cr may be contained in an amount of 0.4% or more. However, in the case in which the content thereof exceeds 1.0%, hardenability may be increased and toughness may be decreased in a welded joint. Therefore, the content of Cr may be limited to a range of 0.4% to 1.0%.

Ti: 0.01-0.1%

Titanium (Ti) forms fine Ti oxides by combining with oxygen (O) and is an element which improves strength and toughness by promoting the formation of acicular ferrite by forming fine TiN precipitates. To this end, Ti may be contained in an amount of 0.01% or more in order to achieve the effects of TiO oxides and TiN complex precipitate. However, in the case in which the content thereof is excessive, coarse Ti oxides and coarse TiN precipitates may be formed and toughness may be decreased. Therefore, an upper limit of Ti content may be limited to 0.1%.

B: 0.003-0.007%

Boron (B) is an element that improves hardenability, which inhibits grain boundary ferrite transformation by being segregated at grain boundaries. That is, along with securing hardenability for improving strength in a welded joint, dissolved B inhibits grain boundary ferrite transformation by diffusing into grain boundaries to lower grain boundary energy, and promotes acicular ferrite transformation. To this end, B may be contained in an amount of 0.003% or more. However, in the case in which the content thereof exceeds 0.007%, the effect thereof may be saturated, weld hardenability may be greatly increased, and a low-temperature transformation phase may be promoted, causing an occurrence of low-temperature weld cracks and a decrease in toughness. Therefore, the content of B may be limited to a range of 0.003% to 0.007%.

N: 0.001-0.006%

Nitrogen (N) is an essential element for forming TiN and VN precipitates, in which an increase in an amount of Ni increases the amount of fine TiN and VN precipitates. In detail, since N noticeably affects the size of TiN precipitates, space between precipitates, distribution of precipitates, the frequency of composite precipitation with oxides, high-temperature self stability of precipitates and the like, N content may be set at an amount of 0.001% or more. However, in the case in which the content thereof exceeds 0.006%, the effect thereof may be saturated and the amount of solid-dissolved N existing within welding metal may increase, resulting in a decrease in toughness. Therefore, the content of N may be limited to a range of 0.001% to 0.006%.

P: 0.02% or Less (Excluding 0)

Phosphorus (P) is an impurity element inducing high-temperature cracks, and may be maintained at the lowest amount possible. Therefore, an upper limit of P content may be limited to 0.02%.

S: 0.01% or Less (Excluding 0)

Sulfur (S) takes effect as an element precipitating MnS composite oxides by combining with Mn. However, in the case in which the content thereof exceeds 0.01%, high-temperature cracks may be caused by forming low melting point compounds such as FeS or the like. Therefore, the content of S may be limited to 0.01% or less.

O: 0.03%-0.07%

Oxygen (O) is an element forming Ti oxides by reacting with Ti during welded joint solidification, in which Ti oxides promote acicular ferrite transformation in a welded joint. In this case, in a case in which the amount of O is less than 0.03%, the Ti oxides cannot be distributed adequately in a welded joint. On the other hand, in a case in which the amount of O exceeds 0.07%, coarse Ti oxides and other oxides such as FeO or the like are generated and may affect impact toughness of a welded joint.

In addition to the aforementioned components, a welded joint according to an exemplary embodiment in the present disclosure may further include one or two or more selected from a group consisting of Nb, V, W, and Zr, and one or two selected from calcium and rare earth metals.

Nb: 0.001-0.1%

Niobium (Nb) is contained to improve hardenability, and is a beneficial element in obtaining bainite structure, having an effect of broadening a generation range of bainite even at a scope in which a cooling rate is low, and an effect of lowering Ar3 temperature. Along with this effect and to obtain improved strength, Nb may be contained in an amount equal to or greater than 0.001%. However, in the case in which the content thereof exceeds 0.1%, Nb may adversely affect toughness of a welded joint by promoting the formation of a martensite austenite (M-A) structure in the welded joint during a welding operation.

V: 0.001-0.1%

Vanadium (V) is an element promoting a ferrite transformation by forming VN precipitates by combining with N. To this end, V may be contained in an amount of 0.001% or more. However, in the case in which the content thereof exceeds 0.1%, V may adversely affect toughness of a welded joint by forming a hard phase such as carbides in a welded joint.

W: 0.05-0.50%

Tungsten (W) is an effective element in precipitation strengthening and improving high temperature strength. In the case in which the content thereof is less than 0.05%, the strength improvement effect may be insignificant. On the other hand, in the case in which the content thereof exceeds 0.50%, W may adversely affect impact toughness of a high-strength welded joint.

Zr: 0.005-0.5%

Zirconium (Zr) forms fine Zr composite oxides by combining with oxygen (O). In order to obtain such a fine Zr complex oxides distribution effect, Zr may be contained in an amount equal to or greater than 0.005%. In the case in which the content thereof exceeds 0.5%, Zr may adversely affect impact toughness by forming coarse Zr composite oxides and coarse ZrN precipitates.

Ca and REM: 0.0005-0.005% and 0.005-0.05% Respectively

Calcium (Ca) and a rare earth metal (REM) may stabilize an arc during a welding operation, and may inhibit a formation of oxides in a welded joint. In addition, Ca and REM are effective elements in improving toughness of a welded joint by inhibiting the growth of austenite grains in a cooling process to promote grain boundary ferrite transformation. To this end, Ca may be contained in an amount of 0.0005% or more, and REM may be contained in an amount of 0.005% or more. However, in the case in which the content of Ca exceeds 0.005% and the content of REM exceeds 0.05%, toughness may be adversely affected from the formation of coarse oxides. Here, REM may be one, or two or more elements, selected from a group consisting of Ce, La, Y, Hf, and the like, and any element may be used to obtain the described effect.

The remainder is formed of Fe and unavoidable impurities.

According to an exemplary embodiment in the present disclosure, the microstructure of a welded joint formed after the flux-cored arc welding (FCAW) may have a mixed structure including 40% or more of acicular ferrite and 40-50% of bainite and martensite in area fraction.

In the case that a structural fraction of martensite or bainite having high strength among the microstructure formed by FCAW increases, strength may be easily achieved, but impact toughness may not reach a satisfactory level. On the other hand, in a case in which a structural fraction of an acicular ferrite having an excellent toughness increases, excellent toughness may be secured in a welded joint, but the strength thereof may not reach a targeted ultra high level. Therefore, the welded joint structure may a mixed structure including 40% or more of acicular ferrite and 40-50% of bainite and martensite in order to secure excellent strength, as well as toughness.

In addition, in order to obtain the mixed structure of a welded joint as described above, a composition may be designed so that a welded joint formed from a base metal and a filler metal being diluted under common welding conditions may satisfy a carbon equivalent (Ceq) value of a range of 0.73-0.85% as defined by Formula 1 below:

$Ceq=C+Si/24+Mn/6+Ni/40+Cr/5+Mo/4+V/14$ <Formula 1>

When the Ceq value may satisfy a range of 0.73%-0.85% as shown above in Formula 1, a balance between impact toughness and ultra high-strength may be obtained in a welded joint, and here, the structure of the welded joint may be formed as a mixed structure as described above. In the case in which the Ceq value is less than 0.73%, impact toughness may be excellent, but an ultra high-strength may not be achieved. Further, in the case in which the Ceq value exceeds 0.85%, ultra high-strength may be secured, but impact toughness may decline.

In addition, in order to prevent cracks from arising in a welded joint formed by applying FCAW thereto, a relatively low degree of weld crack susceptibility of a welded joint of steel by welding heat may be maintained. Therefore, a weld crack susceptibility index Pcm value represented by the following formula 2 may satisfy 0.35% or less.

$Pcm=C+Si/30+(Mn+Cu+Cr)/20+Ni/60+Mo/15+V/10+5B$ <Formula 2>

In a case in which a Pcm value of the weld crack susceptibility of the welded joint exceeds 0.35%, cracks may likely occur in a welded joint. Therefore, the contents of C, Si, Mn, and the like may be controlled to be maintained at a relatively low amount.

As described above, when the Ceq and Pcm values of a welded joint are satisfied with regard to a component composition and microstructure thereof as well as the relationship of the respective components in the proposed exemplary embodiment in the present disclosure, the welded joint may have excellent impact toughness, with an impact absorbed energy (vE) of 80 J or more at a temperature of −5° C.

Hereinafter, a flux-cored arc welding wire according to an exemplary embodiment in the present disclosure allowing for the formation of a welded joint of the present disclosure will be described in detail.

The present inventors have discovered that diffusible hydrogen may be easily released from a welding wire when arc length is adjusted by controlling the conditions of a welding wire such as the following, and have completed the present disclosure, based on this discovery.

[1] Hydrogen partial pressure in an arc may be decreased through decomposition by an arc during welding, through the addition of a carbonate and controlling a carbon (C) content of a welding wire.

[2] Hydrogen may be efficiently reduced in a welding wire through an addition of alkali and alkaline earth metal-based fluorides and reaction of fluorine thereof with hydrogen in a high temperature arc.

According to another exemplary embodiment in the present disclosure, there is provided a high-strength flux-cored arc welding wire including by weight percentage to total weight of the wire, 0.03% to 0.12% of carbon (C); 0.3% to 1.4% of silicon (Si); 1.5% to 3.5% of manganese (Mn); 2.5% to 3.5% of nickel (Ni); 0.3% to 1.0% of molybdenum (Mo); 0.3% to 1.0% of chromium (Cr); 0.4% to 1.0% of copper (Cu); 0.001% to 0.020% of boron (B); 0.02 to 1.5% of titanium (Ti)+magnesium (Mg); remaining iron (Fe) as well as unavoidable impurities; and 4.5% to 9.0% of titanium dioxide ($TiO_2$); 0.2% to 2.0% of silicon dioxide ($SiO_2$); 0.1% to 1.0% of calcium carbonate ($CaCO_3$); 0.10% to 1.5% of one or two or more of K, Na, Li-based alkaline oxides; and alkali or alkaline earth metal-based fluoride containing 0.025 to 0.5% of fluorine.

Hereinafter, reasons for the limiting of the above compositions of a welding wire will be described in detail.

C: 0.03-0.12%

Carbon (C) is an essential element for securing strength in a welded joint and weld hardenability. To this end, C may be contained in an amount of 0.03% or more. However, in the case in which the content thereof exceeds 0.12%, weldability of the welded joint may be greatly decreased, and low-temperature cracks may occur in the welded joint during.

Si: 0.3-1.4%

Silicon (Si) is an element contained to achieve a deoxidizing effect. In the case in which the content of Si is less than 0.3%, the deoxidizing effect in a welded joint may be insufficient, and fluidity of welding metal in the welded joint may be reduced. Further, in the case in which the content thereof exceeds 1.4%, a transformation of martensite austenite (M-A) constituents may be promoted within the welded joint, reducing low-temperature impact toughness and adversely affecting weld crack susceptibility.

Mn: 1.5-3.5%

Manganese (Mn) is a useful element for improving deoxidization and strength in steel, and securing strength and toughness by forming a substitutional solid solution in a matrix structure to solid solution strengthen the matrix. To this end, Mn may be contained in an amount of 1.5% or more. However, in the case in which the content thereof exceeds 3.5%, impact toughness of a welded joint may be degraded due to an increase in hardenability of the welded joint.

Ni: 2.5-3.5%

Nickel (Ni) is an effective element for improving strength and toughness of a matrix by solid solution strengthening. To this end, Ni may be contained in an amount of 2.5% or more. However, in the case in which the content thereof exceeds 3.5%, hardenability of steel may be greatly increased and high-temperature cracks may be generated in a welded joint.

Mo: 0.3-1.0%

Molybdenum (Mo) is an effective element for improving strength and increasing hardenability. To this end, Mo may be contained within a range of 0.3-1.0%. In a case in which the content thereof is less than 0.3%, the effect described above may not be obtained. In a case in which the content thereof exceeds 1.0%, toughness of a high-strength welding metal portion may be affected.

Cr: 0.3-1.0%

Chromium (Cr) is an effective element for increasing hardenability and improving strength. In a case in which the content thereof is less than 0.3%, the effect described above may not be obtained. Further, in the case in which the content thereof exceeds 1.0%, toughness of a welded joint may be degraded.

Cu: 0.4-1.0%

Copper (Cu) is an effective element for improving strength and toughness through solid solution strengthening by being solid dissolved in a matrix, and the effect may not be obtained in a case in which the content of Cu is less than 0.4%. Further, in the case in which the content thereof exceeds 1.0%, hardenability in a welded joint may be increased, decreasing toughness, and high-temperature cracks may be aggravated in a welded joint.

B: 0.001-0.020%

Boron (B) is an element for increasing hardenability and is relatively very useful in inhibiting grain boundary ferrite transformation by being segregated at a grain boundary. To this end, B may be contained in an amount of 0.001% or more. However, in the case in which the content thereof exceeds 0.020%, the effect thereof may be saturated and weld hardenability may greatly increase, promoting martensite transformation within a welded joint and causing low-temperature weld cracks and a decrease in toughness.

Ti+Mg: 0.02-1.5%

Titanium (Ti) is an element that may form fine Ti oxides by combining with oxygen (O), as well as fine TiN precipitates, and magnesium (Mg) is an element that may form Mg oxides through being combined with oxygen (O).

In order to obtain effects arising from forming fine Ti oxides and TiN precipitates, as well as Mg oxides in a welded joint, the addition of the contents of Ti and Mg may be contained in an amount of 0.02% or more. However, in the case in which the content thereof is greater than 1.5%, coarse oxides and coarse precipitates may be formed, affecting the securing of toughness in a welded joint.

In further detail, the aforementioned effect may be sufficiently obtained when the contents of Ti and Mg are contained in amounts that satisfy ranges between 0.01-0.3% and 0.01-1.2%, respectively.

$TiO_2$: 4.5-9.0%

Titanium dioxide ($TiO_2$) may act as a slag generator (slag forming agent), and in a case in which the content of $TiO_2$ is less than 4.5%, the slag amount for blocking molten metal from flowing may be insufficient in vertical upward welding, resulting in defective bead formation. In the case in which the content thereof exceeds 9.0%, the amount of oxygen in a welded joint may become superabundant, inducing high-temperature cracks in a root pass during one-sided welding, and may result in impact toughness degradation.

One or Two of $SiO_2$ and $ZrO_2$: 0.2-2.0%

Silicon dioxide ($SiO_2$) and zirconium dioxide ($ZrO_2$) are effective elements for securing arc stability and slag liquidity, and in a case in which the contents of $SiO_2$ and $ZrO_2$ are less than 0.2%, slag liquidity may become instable, resulting in defective bead formation. Further, in the case in which the contents thereof exceed 2.0%, slag liquidity may be secured, but weldability and bead formation may be deficient due to an increase in spatter generation.

$CaCO_3$: 0.1-1.0%

Calcium carbonate ($CaCO_3$) is effective in reducing diffusible hydrogen in a welded joint by effectively decreasing hydrogen partial pressure in an arc. To this end, the content of $CaCO_3$ may be contained in an amount of 0.1% or more. In the case in which the content thereof exceeds 1.0%, a problem such as arc instability and an excessive increase of weld fumes may occur due to excessive decomposition of $CaCO_3$.

On the other hand, according to an exemplary embodiment in the present disclosure, other carbonates besides $CaCO_3$ may be included.

One or Two or More of K, Na, Li-Based Alkali Oxides: 0.10-1.5%

Potassium (K), sodium (Na), and Lithium (Li)-based alkali oxides may enable easy arc generation by lowering the ionization potential of an arc during welding, and may play a role in maintaining arc stability during welding. To this end, one or two or more of K, Na, and Li-based alkali oxides may be contained in an amount of 0.10% or more. For example, in the case in which the content thereof exceeds 1.5%, an excessive amount of weld fumes may arise from high vapor pressure, and slag viscosity of a molten pool may be excessively reduced, resulting in unstable bead formation.

Amount of F Content of Alkali and Alkaline Earth Metal-Based Fluoride: 0.025-0.5%

A fluoride compound may effectively reduce diffusible hydrogen in a welded joint since the compound may cause fluorine to form within a high-temperature arc during welding and cause a dehydrogenation effect by reacting with hydrogen. To this end, the F content of a fluoride compound may be contained in an amount of 0.025% or more. However, in the case in which the content thereof exceeds 0.5%, an excessive amount of weld fumes may arise from high vapor pressure, resulting in unstable bead formation from an excessive reduction of slag viscosity.

In the present disclosure, one or two or more of calcium fluoride ($CaF_2$), barium fluoride ($BaF_2$), and magnesium fluoride ($MgF_2$) may be used as fluoride compounds.

The flux-cored arc welding material proposed in the present disclosure may include remaining iron (Fe) as well as unavoidable impurities in addition to the described alloy compositions. In satisfying the described alloy compositions, basically required weldability in welding materials may be secured as well as providing a welded joint with excellent impact toughness and wear resistance. In addition, pipe welding may easily be implemented at industrial sites since welding may be possible in any position.

A welded joint formed by performing a welding process using a high-strength flux-cored arc welding wire satisfying the described component compositions may have a microstructure having a mixed structure including 40% or more of acicular ferrite and 40-50% of bainite and martensite so as to be capable of securing ultra high-strength with a tensile strength of 900 MPa or more and an impact toughness of 75 J or more at −20° C. In addition, the diffusible hydrogen content may be effectively decreased, with a diffusible hydrogen content of 6-9 ml/100 g.

The flux-cored arc welding wire provided in the present disclosure is composed of a hoop of mild steel for an outer shell and flux as a filler filling the inside of the wire. The flux is composed of various types of metallic powder for securing material properties of welding metal, and inorganic substances and metallic powder for securing weldability. In general, the weight ratio of flux with respect to the total weight of a flux-cored arc welding wire is 13-25%.

The present disclosure may be provided to improve a degree of weldability of a titanium-containing flux-cored wire of the related art, by adjusting the amount and type of metallic powder for securing material properties of deposited metal within the flux, and by adjusting the types and contents of various types of metallic powder ($TiO_2$, $SiO_2$, $K_2O$, $Na_2O$, $Zr_2O$, $CaCO_3$, $CaF_2$, Ti+Mg) and inorganic substances for securing weldability so as to secure a sound bead formation shape of deposited metal with a very low spatter generation rate during welding, in addition to obtaining a welded joint with an excellent mechanical property.

Mode for Invention

Hereinafter, the exemplary embodiment in the present disclosure will be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Embodiment 1 in Present Disclosure

With respect to a construction steel HSA800 including 0.05 wt % of C, 0.13 wt % of Si, 2.5 wt % of Mn, 0.008 wt % of P, 0.002 wt % of S, and other Ni, Cr, Cu, Nb, Ti, and B; flux-cored arc welding (FCAW) was performed with a heat input range of 20 kJ/mm under 100% $CO_2$ protective gas and using a wire with a diameter of 1.6 mm. FCAW was performed under the conditions of an electric current of 270 A, a voltage of 28V, a welding speed of 23 cm/min, and an interlayer temperature of 150° C. or lower.

The compositions of a welded joint formed through the flux-cored arc welding and the results thereof are presented in Table 1. Welding conditions for the welding operation, microstructural compositions of a welded joint after the welding operation, and mechanical properties thereof are measured and presented in Table 2. Among the mechanical properties, the impact toughness was evaluated through Charpy impact tests (CVN) using KS Standard (KS B 0809) to assess the impact absorbed energy (vE) of the welded joint.

TABLE 1

| Category | Component Composition (wt %) | | | | | | | | | | | | | | | | |
|---|---|---|---|---|---|---|---|---|---|---|---|---|---|---|---|---|---|
| | C | Si | Mn | P | S | Ni | Mo | Cu | Cr | Ti | B | Nb | V | Ca | REM | O (ppm) | Ceq | Pcm |
| Inventive Example 1 | 0.04 | 0.45 | 2.40 | 0.015 | 0.003 | 3.1 | 0.65 | 0.55 | 0.6 | 0.03 | 0.0030 | — | — | — | — | 480 | 0.82 | 0.34 |

TABLE 1-continued

| Category | \multicolumn{16}{c}{Component Composition (wt %)} | | | | | | | | | | | | | | | |
|---|---|---|---|---|---|---|---|---|---|---|---|---|---|---|---|---|---|---|
| | C | Si | Mn | P | S | Ni | Mo | Cu | Cr | Ti | B | Nb | V | Ca | REM | O (ppm) | Ceq | Pcm |
| Inventive Example 2 | 0.03 | 0.35 | 2.60 | 0.012 | 0.004 | 2.9 | 0.60 | 0.50 | 0.5 | 0.04 | 0.0031 | — | — | — | — | 510 | 0.80 | 0.33 |
| Inventive Example 3 | 0.06 | 0.25 | 2.20 | 0.011 | 0.003 | 3.0 | 0.55 | 0.48 | 0.55 | 0.035 | 0.0037 | — | — | — | — | 490 | 0.76 | 0.34 |
| Inventive Example 4 | 0.06 | 0.32 | 2.00 | 0.008 | 0.005 | 2.6 | 0.72 | 0.42 | 0.6 | 0.04 | 0.0040 | — | — | — | — | 480 | 0.77 | 0.33 |
| Inventive Example 5 | 0.05 | 0.42 | 2.20 | 0.009 | 0.004 | 2.8 | 0.60 | 0.45 | 0.7 | 0.04 | 0.0035 | — | — | — | — | 470 | 0.79 | 0.34 |
| Inventive Example 6 | 0.04 | 0.50 | 2.40 | 0.010 | 0.002 | 3.0 | 0.62 | 0.48 | 0.5 | 0.04 | 0.0046 | — | — | — | — | 500 | 0.79 | 0.34 |
| Inventive Example 7 | 0.02 | 0.50 | 2.60 | 0.011 | 0.005 | 3.4 | 0.68 | 0.40 | 0.6 | 0.03 | 0.0034 | 0.01 | — | — | — | 450 | 0.85 | 0.34 |
| Inventive Example 8 | 0.03 | 0.35 | 2.40 | 0.012 | 0.004 | 2.7 | 0.67 | 0.40 | 0.5 | 0.05 | 0.0035 | — | 0.01 | — | — | 460 | 0.78 | 0.31 |
| Inventive Example 9 | 0.02 | 0.45 | 2.50 | 0.010 | 0.005 | 2.9 | 0.50 | 0.46 | 0.4 | 0.07 | 0.0060 | — | — | 0.001 | — | 470 | 0.73 | 0.31 |
| Inventive Example 10 | 0.04 | 0.20 | 1.90 | 0.009 | 0.003 | 3.5 | 0.6 | 0.48 | 0.7 | 0.06 | 0.0040 | — | — | — | 0.001 | 490 | 0.74 | 0.32 |
| Comparative Example 1 | 0.07 | 0.50 | 1.55 | 0.011 | 0.006 | 2.6 | 0.4 | 0.11 | 0.2 | 0.01 | — | — | — | — | — | 530 | 0.55 | 0.25 |
| Comparative Example 2 | 0.05 | 0.30 | 1.93 | 0.011 | 0.004 | 1.7 | 0.2 | 0.25 | 0.6 | 0.03 | 0.0030 | 0.001 | — | — | — | 490 | 0.60 | 0.26 |
| Comparative Example 3 | 0.06 | 0.60 | 2.50 | 0.010 | 0.007 | 2.6 | 0.2 | 0.34 | 0.5 | 0.04 | 0.0040 | — | 0.01 | — | — | 520 | 0.72 | 0.32 |
| Comparative Example 4 | 0.08 | 0.90 | 2.00 | 0.008 | 0.004 | 2.7 | 0.5 | 0.30 | 0.3 | 0.06 | 0.0050 | — | — | — | — | 550 | 0.70 | 0.34 |
| Comparative Example 5 | 0.09 | 0.50 | 2.50 | 0.012 | 0.005 | 2.5 | 0.6 | 0.5 | 0.6 | 0.04 | 0.0030 | — | — | — | — | 490 | 0.86 | 0.38 |
| Comparative Example 6 | 0.04 | 0.60 | 2.50 | 0.011 | 0.007 | 3.4 | 0.8 | 0.7 | 0.8 | 0.03 | 0.0035 | 0.012 | — | — | — | 500 | 0.93 | 0.39 |
| Comparative Example 7 | 0.09 | 0.80 | 2.70 | 0.014 | 0.008 | 3.0 | 0.7 | 0.4 | 0.9 | 0.05 | 0.0055 | — | 0.01 | — | — | 550 | 1.00 | 0.44 |
| Comparative Example 8 | 0.07 | 0.40 | 2.30 | 0.011 | 0.006 | 2.9 | 0.9 | 0.4 | 0.7 | 0.04 | 0.0032 | — | — | — | 0.013 | 480 | 0.92 | 0.39 |
| Comparative Example 9 | 0.03 | 0.37 | 1.50 | 0.015 | 0.010 | 2.4 | 0.9 | 0.2 | 0.3 | 0.05 | 0.0045 | — | — | — | — | 490 | 0.64 | 0.26 |
| Comparative Example 10 | 0.05 | 0.65 | 3.00 | 0.009 | 0.004 | 2.3 | 0.6 | 0.5 | 0.8 | 0.04 | 0.0068 | — | — | 0.01 | — | 510 | 0.94 | 0.40 |

TABLE 2

| Category | Welding Condition | | Fraction of Welded Joint Microstructure (%) | | Mechanical Properties of Welded Joint | |
|---|---|---|---|---|---|---|
| | Welding type | Heat input (kJ/cm) | Acicular ferrite | Bainite + Martensite | Tensile strength (MPa) | $vE_{-5}$ (J) |
| Inventive Example 1 | FCAW | 20 | 53 | 47 | 943 | 108 |
| Inventive Example 2 | FCAW | 20 | 55 | 45 | 955 | 109 |
| Inventive Example 3 | FCAW | 20 | 57 | 43 | 944 | 92 |
| Inventive Example 4 | FCAW | 20 | 55 | 45 | 933 | 104 |
| Inventive Example 5 | FCAW | 20 | 50 | 50 | 941 | 96 |
| Inventive Example 6 | FCAW | 20 | 54 | 46 | 935 | 100 |
| Inventive Example 7 | FCAW | 20 | 59 | 41 | 955 | 95 |
| Inventive Example 8 | FCAW | 20 | 57 | 43 | 943 | 89 |
| Inventive Example 9 | FCAW | 20 | 54 | 46 | 952 | 105 |
| Inventive Example 10 | FCAW | 20 | 65 | 35 | 937 | 102 |
| Comparative Example 1 | FCAW | 20 | 36 | 43 | 857 | 24 |
| Comparative | FCAW | 20 | 32 | 45 | 844 | 28 |

TABLE 2-continued

| Category | Welding Condition | | Fraction of Welded Joint Microstructure (%) | | Mechanical Properties of Welded Joint | |
|---|---|---|---|---|---|---|
| | Welding type | Heat input (kJ/cm) | Acicular ferrite | Bainite + Martensite | Tensile strength (MPa) | $vE_{-5}$ (J) |
| Comparative Example 2 | | | | | | |
| Comparative Example 3 | FCAW | 20 | 34 | 36 | 751 | 32 |
| Comparative Example 4 | FCAW | 20 | 35 | 26 | 823 | 24 |
| Comparative Example 5 | FCAW | 20 | 27 | 54 | 656 | 19 |
| Comparative Example 6 | FCAW | 20 | 22 | 24 | 840 | 14 |
| Comparative Example 7 | FCAW | 20 | 24 | 74 | 841 | 19 |
| Comparative Example 8 | FCAW | 20 | 22 | 77 | 839 | 12 |
| Comparative Example 9 | FCAW | 20 | 29 | 43 | 825 | 20 |
| Comparative Example 10 | FCAW | 20 | 12 | 82 | 823 | 12 |

Figure 1:
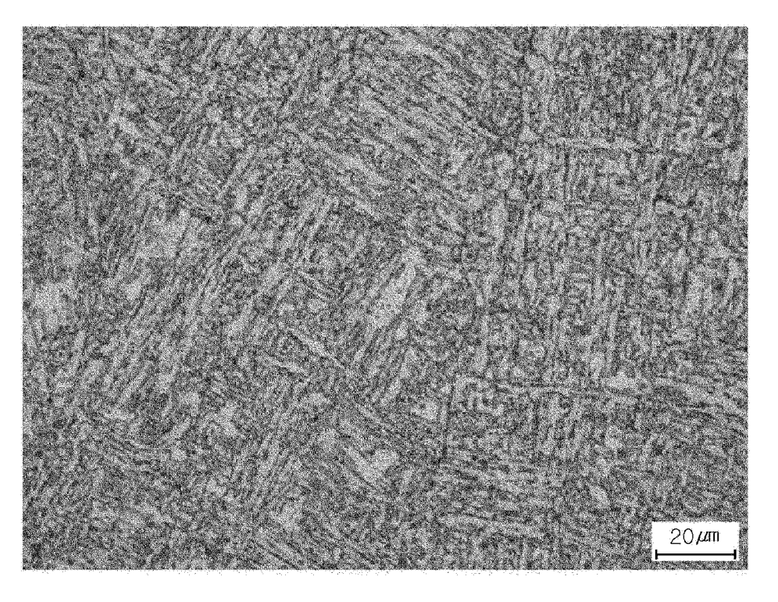
FIG. 1 is a micrograph illustrating microstructures of Inventive Example 2, captured using an optical microscope, according to an exemplary embodiment in the present disclosure.

As illustrated in Tables 1 and 2, the welded joint satisfying all of the proposed component composition, component relationship, and microstructure in the present disclosure demonstrates excellence not only in strength, but also in impact toughness. In detail, in the case of inventive examples, it can be appreciated that strength and toughness have been significantly improved due to the microstructure being controlled by satisfying the component composition and component relationship, unlike the comparative examples. In further detail, it can be appreciated that the microstructure of a welded joint according to the present disclosure is composed of acicular ferrite, bainite, and martensite, as illustrated in Table 1.

In contrast, the comparative examples are examples in which the component composition and component relationship of a welded joint do not satisfy those proposed in the present disclosure. It can be appreciated that an acicular ferrite fraction in the formed microstructure is relatively too low or that a bainite+martensite fraction is either too high or too low, resulting in decreased strength and toughness.

Therefore, it may be understood through the results above that a welded joint satisfying conditions of the present disclosure during a flux-cored arc welding operation demonstrates excellent properties in terms of strength and toughness compared to the comparative examples.

Embodiment 2 in Present Disclosure

A flux-cored welding wire was manufactured with flux filler having component compositions as illustrated in the following Table 3.

Subsequently, flux-cored arc welding was implemented under the conditions of a welding current of 270-290 A, a voltage of 30-32V, a welding speed of 25-27 cm/min, and a welding heat input of 18-25 kJ/cm. The component compositions of a welded joint formed through the welding operation is illustrated in Table 4, and the evaluation results of the mechanical properties of the welded joint, diffusible hydrogen, and arc stability of the welding wire, are illustrated in Table 3.

Here, as a welding base metal, a low yield ratio steel, HSA800 having a low carbon (C)-based tensile strength of 800 MPa or more was used.

A specimen for the above tensile test was extracted from the center portion of the welded joint, using KS Standard (KS B 0801) No. 4 specimens, and tested at a cross head speed of 10 mm/min. The impact test specimen was based upon KS Standard (KS B 0809) No. 3 specimens.

In addition, the diffusible hydrogen content of a welding wire was analyzed using gas chromatography based on ISO 3690, and arc stability was evaluated firsthand by a welder using factors such as spatter generation, arc blow, and the like.

TABLE 3

| Category | C | Si | Mn | Ni | Mo | Cr | Cu | B* | Ti + Mg | $TiO_2$ | $K_2O$ | $Na_2O$ | $ZrO_2$ | $SiO_2$ | $CaF_2$ | $CaCO_3$ | Fill rate |
|---|---|---|---|---|---|---|---|---|---|---|---|---|---|---|---|---|---|
| Inventive Example 1 | 0.02 | 0.34 | 2.8 | 3.0 | 0.65 | 0.6 | 0.55 | 40 | 0.85 | 6.7 | 0.07 | 0.3 | 0.63 | 0.48 | 0.32 | 0.84 | 14% |
| Inventive Example 2 | 0.02 | 0.32 | 1.9 | 2.9 | 0.60 | 0.5 | 0.50 | 38 | 0.84 | 6.6 | 0.07 | 0.3 | 0.60 | 0.49 | 0.32 | 0.80 | 15% |
| Inventive Example 3 | 0.02 | 0.30 | 2.1 | 3.0 | 0.55 | 0.55 | 0.48 | 47 | 0.83 | 6.6 | 0.06 | 0.3 | 0.61 | 0.49 | 0.32 | 0.85 | 14% |
| Inventive Example 4 | 0.02 | 0.40 | 2.5 | 2.6 | 0.72 | 0.6 | 0.42 | 48 | 0.84 | 6.6 | 0.07 | 0.3 | 0.62 | 0.50 | 0.31 | 0.83 | 15% |
| Inventive Example 5 | 0.03 | 0.32 | 3.4 | 2.8 | 0.60 | 0.7 | 0.45 | 45 | 0.85 | 6.6 | 0.06 | 0.3 | 0.60 | 0.48 | 0.32 | 0.84 | 13% |
| Comparative Example 1 | 0.03 | 0.20 | 1.0 | 2.6 | 0.30 | 0.2 | 0.11 | — | 0.47 | 3.6 | 0.02 | 0.7 | 0.90 | 0.48 | 0.12 | 0.85 | 15% |

TABLE 3-continued

| Category | C | Si | Mn | Ni | Mo | Cr | Cu | B* | Ti + Mg | TiO$_2$ | K$_2$O | Na$_2$O | ZrO$_2$ | SiO$_2$ | CaF$_2$ | CaCO$_3$ | Fill rate |
|---|---|---|---|---|---|---|---|---|---|---|---|---|---|---|---|---|---|
| Comparative Example 2 | 0.02 | 0.19 | 1.2 | 1.7 | 0.20 | 0.6 | 0.25 | 40 | 0.37 | 3.7 | 0.02 | 0.8 | 0.63 | 0.49 | 0.12 | 1.24 | 17% |
| Comparative Example 3 | 0.02 | 0.30 | 1.2 | 2.6 | 0.20 | 0.5 | 0.34 | 45 | 0.47 | 12.7 | 0.01 | 0.8 | 0.82 | 0.49 | 0.10 | 1.34 | 16% |
| Comparative Example 4 | 0.02 | 0.65 | 1.3 | 2.2 | 0.40 | 0.3 | 0.30 | 59 | 0.34 | 9.6 | 0.02 | 0.3 | 0.72 | 0.49 | 0.12 | 0.43 | 15% |
| Comparative Example 5 | 0.02 | 0.25 | 1.7 | 2.5 | 0.20 | 0.6 | 0.50 | 42 | 0.45 | 9.7 | 0.01 | 0.2 | 0.82 | 0.49 | 0.32 | 0.53 | 15% |

(The unit of B* in Table 1 is ppm)

TABLE 4

| Category | C | Si | Mn | P | S | Ni | Mo | Cu | Cr | Ti | B | O | Ceq | Pcm |
|---|---|---|---|---|---|---|---|---|---|---|---|---|---|---|
| Inventive steel 1 | 0.04 | 0.45 | 2.4 | 0.015 | 0.003 | 3.1 | 0.65 | 0.55 | 0.6 | 0.03 | 30 | 480 | 0.82 | 0.34 |
| Inventive steel 2 | 0.03 | 0.35 | 2.6 | 0.012 | 0.004 | 2.9 | 0.60 | 0.50 | 0.5 | 0.04 | 31 | 510 | 0.80 | 0.33 |
| Inventive steel 3 | 0.06 | 0.25 | 2.2 | 0.011 | 0.003 | 3.0 | 0.55 | 0.48 | 0.55 | 0.035 | 37 | 490 | 0.76 | 0.34 |
| Inventive steel 4 | 0.06 | 0.32 | 2.0 | 0.008 | 0.005 | 2.6 | 0.72 | 0.42 | 0.6 | 0.04 | 40 | 480 | 0.77 | 0.33 |
| Inventive steel 5 | 0.05 | 0.42 | 2.2 | 0.009 | 0.004 | 2.8 | 0.60 | 0.45 | 0.7 | 0.04 | 35 | 470 | 0.79 | 0.34 |
| Comparative steel 1 | 0.07 | 0.50 | 1.55 | 0.011 | 0.006 | 2.6 | 0.40 | 0.11 | 0.2 | 0.01 | — | 530 | 0.55 | 0.25 |
| Comparative steel 2 | 0.05 | 0.30 | 1.93 | 0.011 | 0.004 | 1.7 | 0.20 | 0.25 | 0.6 | 0.03 | 30 | 490 | 0.60 | 0.26 |
| Comparative steel 3 | 0.06 | 0.60 | 2.5 | 0.010 | 0.007 | 2.6 | 0.20 | 0.34 | 0.5 | 0.04 | 40 | 520 | 0.72 | 0.32 |
| Comparative steel 4 | 0.08 | 0.90 | 2.0 | 0.008 | 0.004 | 2.7 | 0.50 | 0.30 | 0.3 | 0.06 | 50 | 550 | 0.70 | 0.34 |
| Comparative steel 5 | 0.09 | 0.50 | 2.5 | 0.012 | 0.005 | 2.5 | 0.60 | 0.50 | 0.6 | 0.04 | 30 | 490 | 0.86 | 0.38 |

TABLE 5

| | Welding Condition | | Welded Joint | | |
|---|---|---|---|---|---|
| Category | Process | Heat Input (kJ/cm) | Arc Stability | Diffusible Hydrogen Content (mg/100 g) | Tensile Strength (MPa) | vE$_{-20}$ (J) |
| Inventive Steel 1 | FCAW | 19 | Good | 7 | 913 | 87 |
| Inventive Steel 2 | FCAW | 21 | Good | 6.5 | 915 | 83 |
| Inventive Steel 3 | FCAW | 20 | Good | 7.3 | 914 | 96 |
| Inventive Steel 4 | FCAW | 21 | Good | 8 | 903 | 90 |
| Inventive Steel 5 | FCAW | 22 | Good | 8.3 | 911 | 79 |
| Comparative Steel 1 | FCAW | 21 | Good | 10 | 834 | 23 |
| Comparative Steel 2 | FCAW | 20 | Good | 13.8 | 921 | 26 |
| Comparative Steel 3 | FCAW | 19 | Average | 12.6 | 755 | 32 |
| Comparative Steel 4 | FCAW | 20 | Average | 13 | 843 | 19 |
| Comparative Steel 5 | FCAW | 20 | Average | 11 | 865 | 26 |

As illustrated in Table 5, when performing a flux-cored arc welding operation using a welding wire according to the present disclosure (Inventive Steel 1 to 5), impact toughness may be secured while having a high-strength physical property of 900 MPa or more even at a welding heat input of 19 kJ/cm or more, and the diffusible hydrogen content is found to be significantly low, being 9 mg/100 g or less.

On the other hand, Comparative Steels 1 to 5 using a welding wire which does not satisfy the component compositions proposed by the present disclosure exhibited one or more deficient physical properties of strength and impact toughness, and the diffusible hydrogen content is found to be significantly deficient, all being 10 mg/100 g or more.

While exemplary embodiments have been shown and described above, it will be apparent to those skilled in the art that modifications and variations could be made without departing from the scope of the invention as defined by the appended claims.

The invention claimed is:

1. A flux-cored arc welded joint, comprising:
0.01 wt % to 0.06 wt % of carbon (C), 0.1 wt % to 0.5 wt % of silicon (Si), 1.5 wt % to 3.0 wt % of manganese (Mn), 2.5 wt % to 3.5 wt % of nickel (Ni), 0.5 wt % to 1.0 wt % of molybdenum (Mo), 0.4 wt % to 1.0 wt % of copper (Cu), 0.4 wt % to 1.0 wt % of chromium (Cr), 0.035 wt % to 0.1 wt % of titanium (Ti), 0.003 wt % to 0.007 wt % of boron (B), 0.001 wt % to 0.006 wt % of nitrogen (N), 0.02 wt % (excluding 0) or less of phosphorus (P), 0.01 wt % (excluding 0) or less of sulfur (S), 0.03 wt % to 0.07 wt % of oxygen (O), and remaining iron (Fe) as well as unavoidable impurities; and a mixed microstructure including acicular ferrite, bainite and martensite, wherein the mixed microstructure comprises: 40 area % or more of the acicular ferrite, and a 40-50% of the bainite and the martensite in an area fraction.

2. The flux-cored arc welded joint of claim 1, further comprising:

at least one selected from the group consisting of 0.001 wt % to 0.1 wt % of niobium (Nb), 0.001 wt % to 0.1 wt % of vanadium (V), 0.05 wt % to 0.50 wt % of tungsten (W), and 0.005 wt % to 0.5 wt % of zirconium (Zr); and at least one selected from the group consisting of 0.0005 wt % to 0.005 wt % of calcium (Ca), and 0.005 wt % to 0.05 wt % of a rare earth metal (REM).

3. The flux-cored arc welded joint of claim 2, wherein a carbon equivalent (Ceq) value satisfies 0.73-0.85% as defined by Formula 1 below:

$$Ceq = C + Si/24 + Mn/6 + Ni/40 + Cr/5 + Mo/4 + V/14. \quad \text{<Formula 1>}$$

4. The flux-cored arc welded joint claim 2, wherein a weld crack susceptibility index Pcm value satisfies 0.35% or less as defined by Formula 2 below:

$$Pcm = C + Si/30 + (Mn+Cu+Cr)/20 + Ni/60 + Mo/15 + V/10 + 5B. \quad \text{<Formula 2>}$$

5. The flux-cored arc welded joint of claim 1, having impact toughness of 80 J or more at a temperature of −5° C.

6. The flux-cored arc welded joint of claim 1, having tensile strength of 900 MPa or more.

\* \* \* \* \*